United States Patent
Boersma et al.

[11] Patent Number: 5,929,423
[45] Date of Patent: Jul. 27, 1999

[54] METHOD AND DEVICE FOR DECODING BAR CODES

[75] Inventors: Gerrit Boersma, Odijk; Dennis Johannes Maat, Pijnacker, both of Netherlands

[73] Assignee: Scantech B.V., Amersfoort, Netherlands

[21] Appl. No.: 08/930,038

[22] PCT Filed: Mar. 28, 1996

[86] PCT No.: PCT/NL96/00131

§ 371 Date: Nov. 12, 1997

§ 102(e) Date: Nov. 12, 1997

[87] PCT Pub. No.: WO96/30859

PCT Pub. Date: Oct. 3, 1996

[30] Foreign Application Priority Data

Mar. 28, 1995 [NL] Netherlands ............ 9500597

[51] Int. Cl.⁶ ............................................. G06K 7/10
[52] U.S. Cl. ............................. 235/462.16; 235/462.25
[58] Field of Search ....................... 235/462.16, 462.18, 235/462.17, 462.19, 462.25, 462.27, 494

[56] References Cited

U.S. PATENT DOCUMENTS

| | | | |
|---|---|---|---|
| 3,723,710 | 3/1973 | Crouse et al. | 235/462.19 |
| 4,245,152 | 1/1981 | Flurry et al. | 235/462.19 |
| 4,855,581 | 8/1989 | Mertel et al. | 235/462.18 X |
| 5,077,463 | 12/1991 | Sato | 235/462.17 |
| 5,276,316 | 1/1994 | Blanford | 235/462.12 |
| 5,304,786 | 4/1994 | Pavlidis et al. | 235/462.07 |
| 5,329,105 | 7/1994 | Klancnik et al. | 235/462.16 |
| 5,412,196 | 5/1995 | Surka | 235/494 X |
| 5,773,807 | 6/1998 | Barkan et al. | 235/462.27 |

FOREIGN PATENT DOCUMENTS

| | | |
|---|---|---|
| 0 066 680 | 5/1981 | European Pat. Off. . |
| 0 250 778 | 1/1986 | European Pat. Off. . |
| 0 304 146 | 6/1987 | European Pat. Off. . |
| 0 439 682 A2 | 8/1991 | European Pat. Off. . |

*Primary Examiner*—Donald Hajec
*Assistant Examiner*—Jared J. Fureman
*Attorney, Agent, or Firm*—Bell, Boyd & LLoyd

[57] ABSTRACT

A method and apparatus for decoding one or more bar codes comprising a plurality of marks, the marks comprise one or more spaces and one or more bars. The method comprises the following steps: digitalizing electrical signals obtained from a pick-up for picking up reflected laser beams; deriving the width of bars and spaces from the digital signals; determining one or more mark values with a degree on the basis of the width of the spaces and bars found inside the mark or in the immediate vicinity of the mark; determining one or more information values with a degree from the mark values with a degree; and selecting the most probable information values for a bar code or part of a bar code using the determined information values.

10 Claims, 15 Drawing Sheets edge mark separation mark

| TX | | MX | MARK =0 | MARK =1 |
|---|---|---|---|---|
| T0 | 291 | M0 | 4.14 | 7.22 |
| T1 | 78 | M1 | 1.98 | 1.94 |
| T2 | 79 | M2 | 2.99 | 1.96 |
| T3 | 184 | M3 | 5.04 | 4.57 |
| T4 | 200 | M4 | 5.02 | 4.96 |
| T5 | 96 | M5 | 3.01 | 2.38 |
| T6 | 79 | M6 | 2.06 | 1.96 |
| T7 | 80 | M7 | 2.01 | 1.99 |
| T8 | 82 | M8 | 1.98 | 2.04 |
| T9 | 120 | M9 | 2.41 | 2.98 |
| T10 | 200 | M10 | 5.02 | 4.96 |
| T11 | 201 | M11 | 4.62 | 4.99 |
| T12 | 119 | M12 | 1.98 | 2.95 |
| T13 | 79 | M13 | 1.96 | 1.96 |
| T14 | 165 | M14 | 7.30 | 4.10 |

FIG. 7

| P | Q | R0 | | | | | | |
|---|---|---|---|---|---|---|---|---|
| | | 2 | 3 | 4 | 5 | 6 | 7 | 8 |
| 2 | 2 | | | | 1B6 | 2B6 | 3B6 | 4B6 |
| | 3 | | | 1A9 | 2A9 | 3A9 | 4A9 | |
| | 4 | | 1B9 | 2B9 | 3B9 | 4B9 | | |
| | 5 | 1A6 | 2A6 | 3A6 | 4A6 | | | |
| 3 | 2 | | | 1A0 | 2A0 | 3A0 | 4A0 | |
| | 3 | | 1B2 | 2B2 | 3B2 | 4B2 | | |
| | | | | 1B8 | 2B8 | 3B8 | 4B8 | |
| | 4 | | 1A2 | 2A2 | 3A2 | 4A2 | | |
| | | 1A8 | 2A8 | 3A8 | 4A8 | | | |
| | 5 | 1B0 | 2B0 | 3B0 | 4B0 | | | |
| 4 | 2 | | 1B4 | 2B4 | 3B4 | 4B4 | | |
| | 3 | | 1A1 | 2A1 | 3A1 | 4A1 | | |
| | | 1A7 | 2A7 | 3A7 | 4A7 | | | |
| | 4 | 1B1 | 2B1 | 3B1 | 4B1 | | | |
| | | | 1B7 | 2B7 | 3B7 | 4B7 | | |
| | 5 | 1A4 | 2A4 | 3A4 | 4A4 | | | |
| 5 | 2 | 1A3 | 2A3 | 3A3 | 4A3 | | | |
| | 3 | 1B5 | 2B5 | 3B5 | 4B5 | | | |
| | 4 | 1A5 | 2A5 | 3A5 | 4A5 | | | |
| | 5 | 1B3 | 2B3 | 3B3 | 4B3 | | | |

FIG.15

| left half 13th digit | Order permutation | | | | | | |
|---|---|---|---|---|---|---|---|
| 0 | edge mark | A | A | A | A | A | A | separation mark |
| 1 | | A | A | B | A | B | B | |
| 2 | | A | A | B | B | A | B | |
| 3 | | A | A | B | B | B | A | |
| 4 | | A | B | A | A | B | B | |
| 5 | | A | B | B | A | A | B | |
| 6 | | A | B | B | B | A | A | |
| 7 | | A | B | A | B | A | B | |
| 8 | | A | B | A | B | B | A | |
| 9 | | A | B | B | A | B | A | |
| right half | | B | B | B | B | B | B | |

FIG.16

METHOD AND DEVICE FOR DECODING BAR CODES

BACKGROUND

Use is being made on increasingly large scale and in many different fields of bar codes, for instance in supermarkets but also for stock control and the like. Using bar codes stock control is improved, transit speed is increased and more accurate specifications of supplied goods can be given to the buyer, such as the consumer.

It is still a regular occurrence however that a bar code is not decoded at the first reading by a scanning device. This can be due for instance to a differing width of a bar or space, as well as to the inhomogeneity of the paper on which the bar pattern is printed, noise occurring for instance as a result of ambient influences or caused by analog electronics, thermal noise and/or variations in the scanning equipment used.

Known scanning devices, for instance making use of laser beams, of CCD (Charge Coupled Devices) image recorders and/or making use of RF (Radio Frequency) induction and methods for decoding bar codes are widely described in the patent literature, for instance in the non pre-published European patent applications 952015097 and 952021939 of applicant.

Also known from EP 0439682 is a method and device according to the precharacterising part of claims 1 and 8 respectively.

SUMMARY OF THE INVENTION

The present invention provides a method for decoding one or more bar codes comprising a plurality of marks, such as information marks, separation marks and the like, wherein each of the marks comprises one or more spaces and one or more bars wherein each bar or space is formed by at least one module, and wherein the method comprises the steps of:
  digitalizing electrical signals obtained from a pick-up, for instance a pick-up for picking up reflected laser beams;
  deriving from the obtained electrical signals for each barcode time pairs, each of which is formed by the combined width of a bar and an adjacent space;
  deriving from said time pairs mark values indicating the number of modules covered by each time pair;
characterized by:
  applying membership functions to said mark values to determine the membership degree with which each mark value has a length of an integer number of modules;
  determining from the mark values and their membership degrees the possible information values represented by the barcode and their membership degrees, using a predetermined relationship between mark values and information values; and
  selecting the most probable information values for a bar code or part thereof using the determined information values and their membership degrees.

It has been demonstrated in practice with the method according to the present invention that difficult bar patterns are also recognized more quickly. In addition, the present invention provides a device for scanning and decoding bar patterns.

The present invention further provides an apparatus for decoding one or more barcodes comprising a plurality of marks, such as information marks, separation marks and the like, wherein each of the marks comprises one or more spaces and one or more bars wherein each bar or space is formed by at least one module, and wherein the apparatus comprises:
  means for digitalizing electrical signals obtained from a pick-up, for instance a pick-up for picking up reflected laser beams;
  means for deriving from the obtained electrical signals for each barcode time pairs, each of which is formed by the combined width of a bar and an adjacent space;
  means for deriving from said time pairs mark values indicating the number of modules covered by each time pair;
characterized by:
  means for applying membership functions to said mark values to determine the membership degree with which each mark value has a length of an integer number of modules;
  means for determining from the mark values and their membership degrees the possible information values represented by the barcode and their membership degrees, using a predetermined relationship between mark values and information values; and
  means for selecting the most probable information values for a bar code or part thereof using the determined information values and their membership degrees.

deriving the width of bars and spaces from the digital signals;
  determining one or more mark values with a degree on the basis of the width of the spaces and bars found inside the mark or in the immediate vicinity thereof;
  determining one or more information values with a degree from the mark values with a degree; and
  selecting the most probable information values for a bar code or part thereof using the determined information values.

It has been demonstrated in practice with the method according to the present invention that difficult bar patterns are also recognized more quickly. In addition, the present invention provides a device for scanning and decoding bar patterns.

The present invention further provides a device for decoding bar codes.

BRIEF DESCRIPTION OF THE DRAWINGS

Further advantages, features and details of the present invention will be detected on the basis of the following description wherein reference is made to the annexed drawings, in which:

FIG. 7 shows an example of the processing of the data of FIG. 6;

FIG. 15 shows a table for determining information marks on the basis of values of P, Q and R0;

FIG. 16 shows a table in which the possible order permutations are given for left and right halves of an EAN-13 symbol;

DETAILED DESCRIPTION

The present invention is applicable to EAN-13 patterns (see the Handbook of Uniform Article Coding of the UAC Foundation), but can likewise be applied for EAN-8, UPCA, UPCE, in addition to industrial codes CODE-128, CODE-39, CODABAR, 20F5, etc.

During reading of bar codes errors can be introduced as a result of diverse causes. During printing of a bar code on a packaging variations can occur, for instance due to shifting during making of the film mask, the manufacture of the printing plates, the pressure of the printing plates on the carrier, absorption of the paper etc. The colour contrast is not always optimal since producers attempt to integrate the bar pattern as much as possible into the packaging. Deformation of the packaging can occur.

Errors can further be introduced by deformation of the packaging.

In addition, errors can occur during scanning which can be ascribed to the optics, the analog electronics, as well as to digitalizing of analog signals. Finally, ambient influences, such as dirt, moisture or damage to the packaging, can introduce errors.

A greater part of the errors in reading the above mentioned bar codes can be traced back to the shifting of boundaries between bars and spaces. A significant part of these errors are systematic errors manifesting themselves in a form described as average print widening. Herein the derived widths of all bars in the bar code are an amount delta larger than in an ideal bar code, while the widths of the spaces in the bar codes are the same amount delta smaller.

Figure 1:
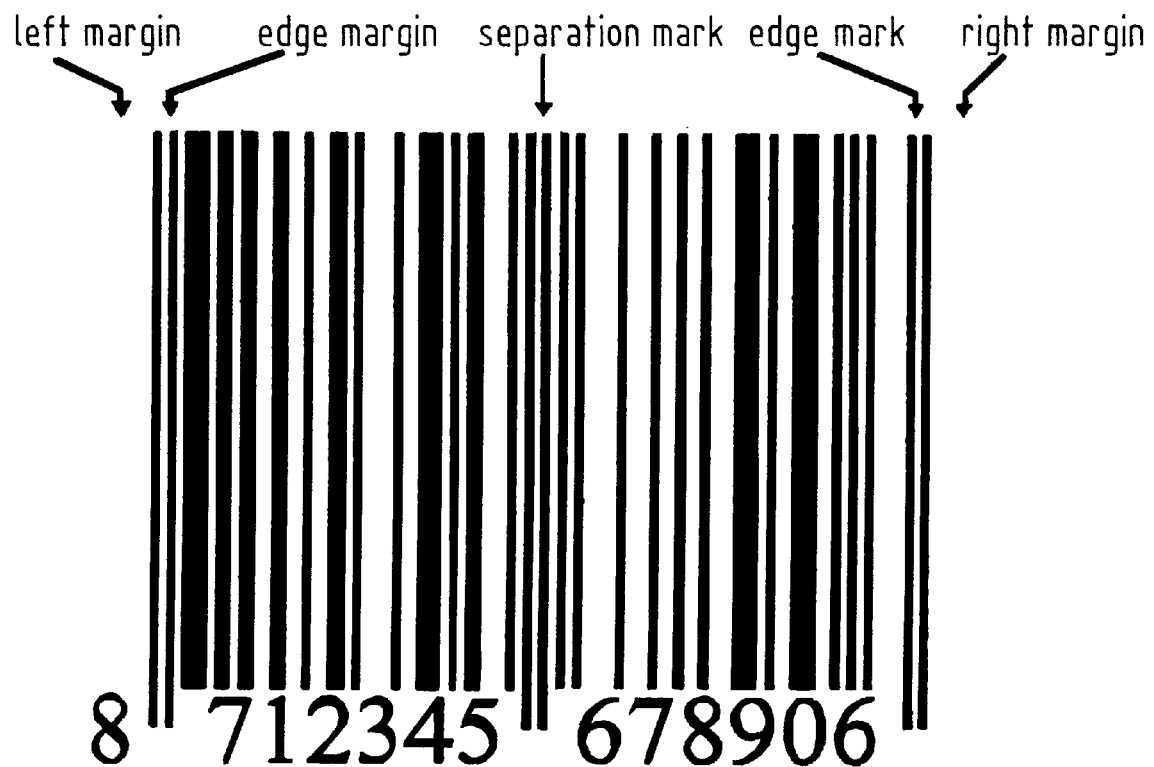
FIG. 1 shows an EAN-13 bar pattern.

An EAN-13 symbol or bar pattern comprises a separation mark with 6 information marks on either side flanked on the outsides by an edge mark (FIG. 1). The symbol is moreover provided with a left and a right-hand margin. The left half comprises 6 information marks from the number series A and B, while the right half comprises 6 information marks from the number series C (see FIG. 2). Noticeable is that the patterns from the number series C are exact mirror images of the patterns from the number series B.

Figure 3:
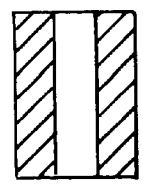
FIG. 3 shows an overview of the auxiliary marks used in an EAN-13 symbol.
Figure 3:
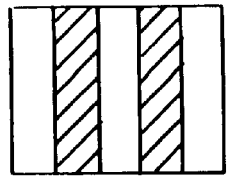

Auxiliary marks and information marks are built up of bars and spaces which both comprise a whole number of units or modules (see FIG. 3). A module has a fixed width within a symbol. Beneath the symbol is the representation of the thirteen digit article number which is legible for people.

The present decoding method is suitable for both forward and backward decoding. Since in terms of structure the right half of an EAN-13 code corresponds in mirror image with a left half, this code can be read inward, i.e. decoding from an edge mark to the separation mark, or read outward, i.e. from the separation mark to an edge mark. The signal MARK indicates with the value 1 that decoding must take place from outside to inside and with the value 0 that it must take place in reverse direction. Whether this involves a left or a right half is ultimately determined with reference to the number series of the information marks. The signal MARK changes polarity each time the width of a bar or space is determined, so that decoding takes place alternately from outside to inside and vice versa.

The decoding process for EAN-13 symbols is built up of three parts (see also FIG. 4):

decoding of information marks constituting bar code halves constituting and selecting the most probable bar code.

Figure 2:
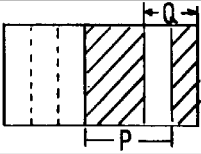
FIG. 2 shows a table of the information marks used in an EAN-13 symbol.
Figure 5:
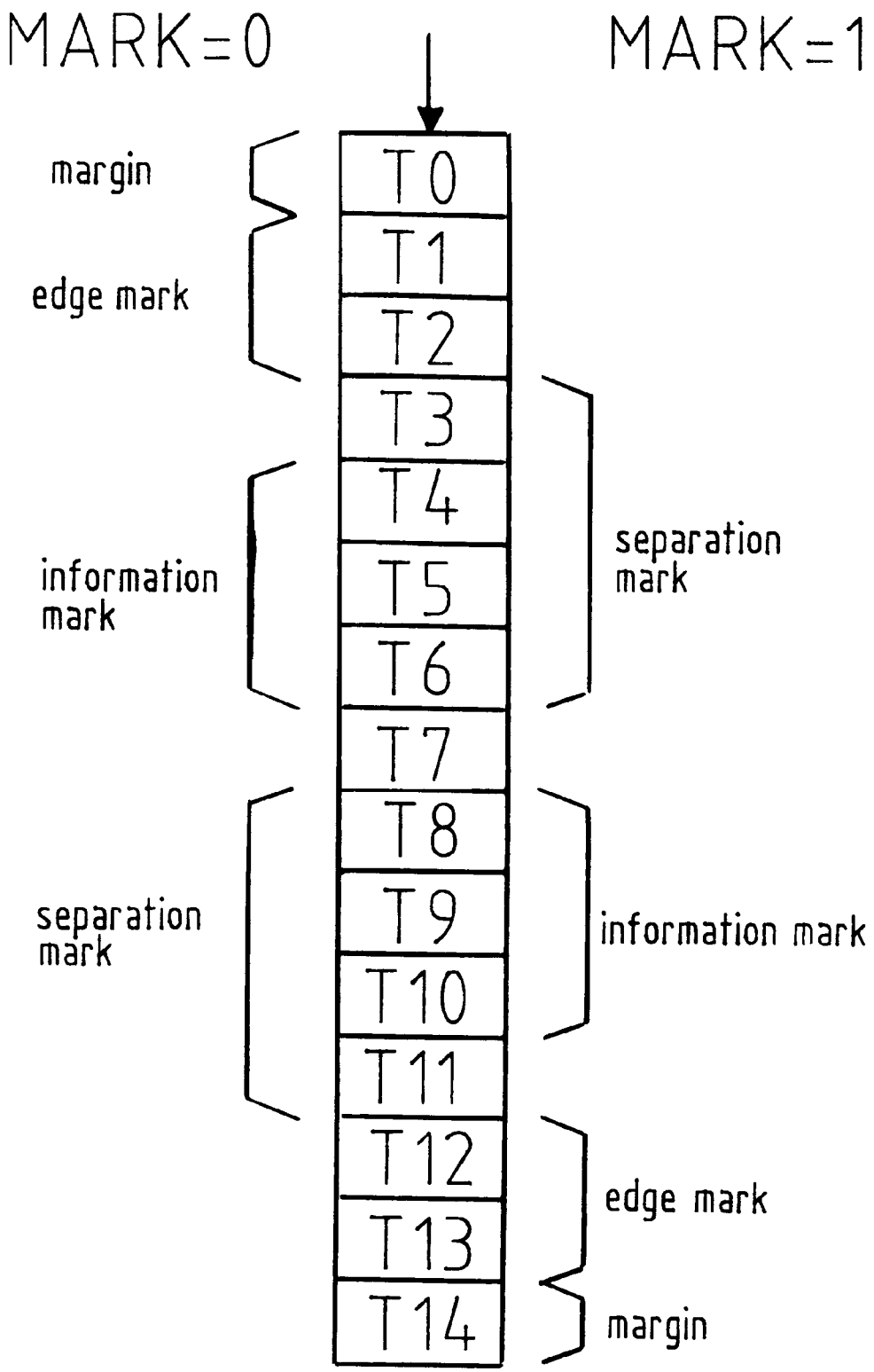
FIG. 5 shows a detail of FIG. 4.

In decoding EAN-13 codes according to the a present invention so-called time pairs are taken as starting point (FIG. 5). A time pair is obtained by adding together the widths of a bar and an adjacent space. For each bar a time pair is formed with the preceding space as well as a time pair with the following space. The time pairs P and Q used in the present invention are shown in FIG. 2. The advantage of this manner of operation is that the problem of the average print widening is completely resolved. The time pairs are placed in a so-called data pipe. This data pipe consists of 15 registers. Each time a new time pair is calculated the content of the data pipe shifts up one register to make room for the new time pair. The content of register 14 herein disappears while the new time pair is placed in register 0.

Figure 6:
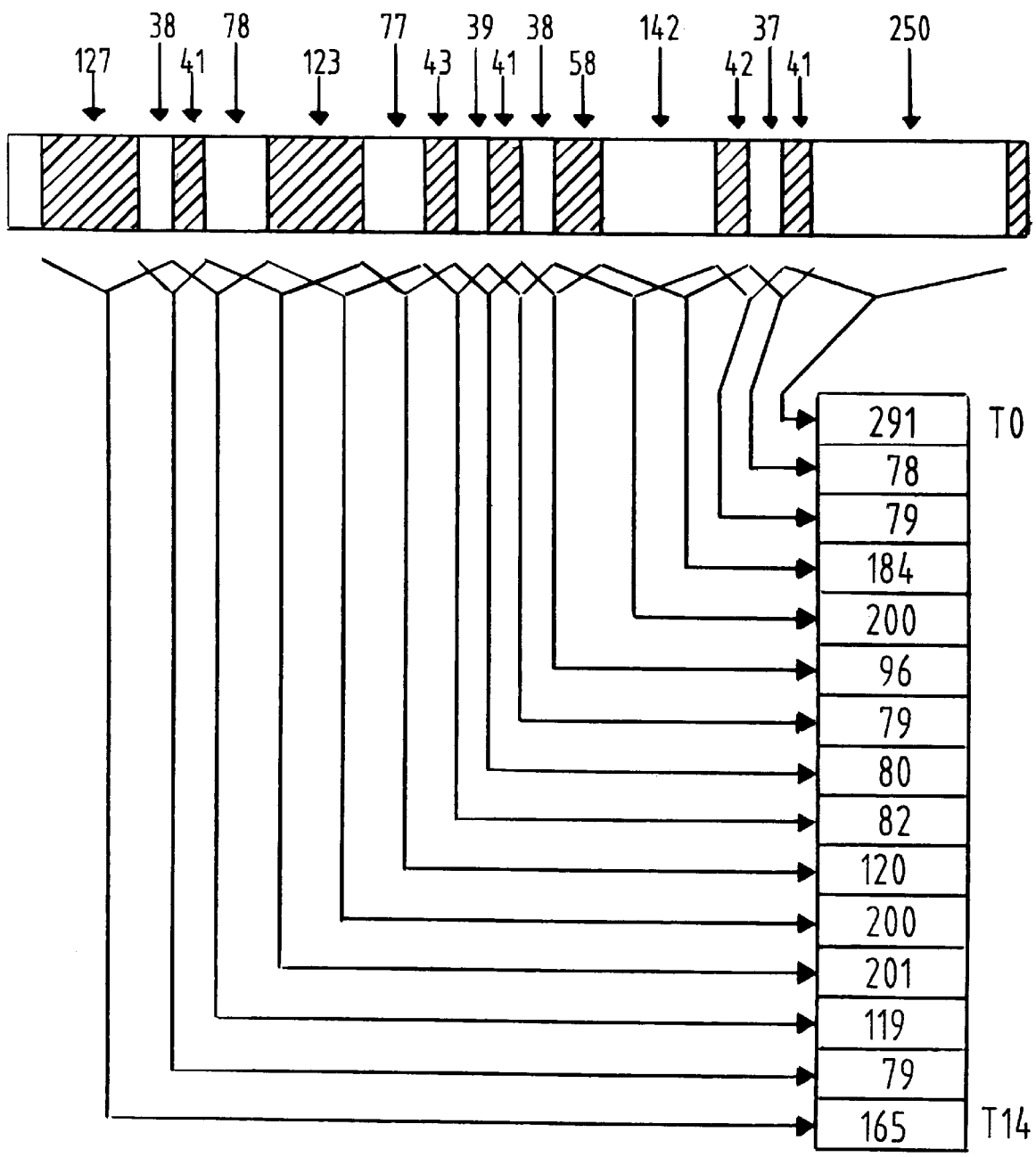
FIG. 6 shows an example of the use of the diagram of FIG. 5.

EXAMPLE: FIG. 6 illustrates how the fill of the data pipe looks with a given bar pattern.

Each time a new time pair is placed in the data pipe, it is assumed that an information mark is present and an attempt is made to decode the mark. The width and position of the information mark is fixed with two time pairs. If MARK has the value 1, the time pairs in registers 8 and 10 determine the width and if MARK has the value 0 the registers 4 and 6 determine the width. With this manner of operation not a single information mark is skipped, and in any case with the correct polarity of MARK all information marks end up at some point in the said positions of the data pipe.

The information mark in question is situated between an edge mark and an information mark or between two information marks or between an information mark and the separation mark (see FIG. 1). To enable placing of the mark during constituting of a bar code half, a check is made for each information mark as to whether it adjoins a separation mark or an information mark on the one side and whether it adjoins an edge mark with associated margin on the other side. To make these checks possible a data pipe is chosen with a length of 15 registers. A different length would however also have been possible.

The present decoding method has a large dynamic range in that the width of the information mark is used as reference for determining the content of the information mark and also for checking the auxiliary marks. A large dynamic range is particularly important for a laser scanner, a bar code can in any case have diverse dimensions and can be situated close to the scanner or at a greater distance. Since an information mark in an EAN-13 symbol nominally has a fixed dimension of 7 modules, this width is suitable for use as reference. A subsequent step in the decoding process is that all relevant time pairs are standardized to this reference. Since decoding from inside to outside relative to decoding in the reverse direction amounts in fact to a mirror image in register 7 in terms of interpreting the data pipe, the mirror image is or is not executed depending on MARK during standardization.

If MARK has the value 1:

$$M3=(T3*7)/(T8+T10)$$

$$M4=(T4*7)/(T8+T10)$$

$$M5=(T5*7)/(T8+T10)$$

$$M6=(T6*7)/(T8+T10)$$

$$M7=(T7*7)/(T8+T10)$$

$$M8=(T8*7)/(T8+T10)$$

$$M9=(T9*7)/(T8+T10)$$

$$M11=(T11*7)/(T8+T10)$$

$$M12=(T12*7)/(T8+T10)$$

$$M13=(T13*7)/(T8+T10)$$

$$M14=(T14*7)/(T8+T10)$$

If MARK has the value 0:

$$M3=(T11*7)/(T6+T4)$$

$$M4=(T10*7)/(T6+T4)$$

$$M5=(T9*7)/(T6+T4)$$

$$M6=(T8*7)/(T6+T4)$$

$$M7=(T7*7)/(T6+T4)$$

$$M8=(T6*7)/(T6+T4)$$

$$M9=(T5*7)/(T6+T4)$$

$$M11=(T3*7)/(T6+T4)$$

$$M12=(T2*7)/(T6+T4)$$

$$M13=(T1*7)/(T6+T4)$$

$$M14=(T0*7)/(T6+T4)$$

Herein Tx is the content of the register x of the data pipe. The variable Mx can be interpreted as the number of modules covered by the time pair x. It should be noted herein that both Tx and Mx belong in principle to the set of the real numbers, although for an implementation whole or fixed point numbers will generally be chosen.

EXAMPLE: FIG. 7 shows for both values of MARK and a fill of the data pipe the associated values of Mx.

Each bar or space of an information and auxiliary mark consists of a whole number of modules. In conventional decoding methods the Mx numbers are rounded off to the nearest whole number. In the present decoding method however, no discretization but fuzzification takes place by applying membership functions per relevant whole value. As is usual in the fuzzy set theory the membership functions always produce a real number or degree which is greater than or equal to 0 and smaller than or equal to 1. A degree of 0 corresponds with the logical value FALSE and 1 corresponds with TRUE. Another range is of course possible which may also comprise negative numbers.

Figure 8:
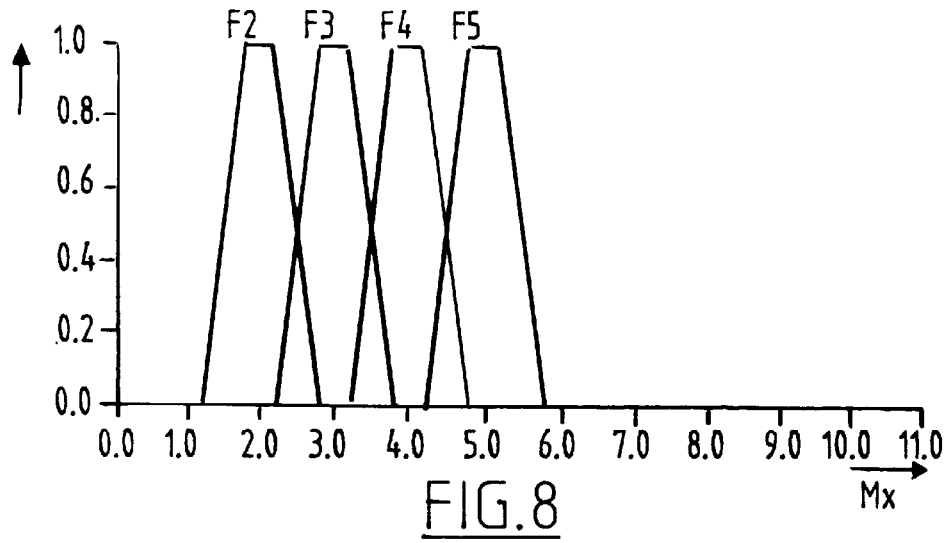
FIGS. 8–12 show examples of membership functions for various components of a bar code.

FIG. 8 gives examples of membership functions which are applied to M8 and M9. The regions in FIG. 13 corresponding with M9 and M8 are designated respectively with the symbols P and Q. As can be derived from the table in FIG. 2, P and Q can only have the values 2, 3, 4 and 5. In the present method these values correspond with a set of F2, F3, F4 and F5 which each have their own membership function. P contains a subset hereof, i.e. those values for which the associated membership function has a degree greater than 0 for a given M9. In the same manner Q contains a subset associated with a given M8. The sets P and Q may be empty or may contain one or more elements.

EXAMPLE: In FIG. 7, M8 has the value 1.98 and M9 has the value 2.41 in the case MARK is 0. With the membership functions of FIG. 8, P obtains the elements 2 (0.65) and 3 (0.35) and Q the element 2 (1.0), wherein the degree is shown in brackets.

Figures 13, 14:
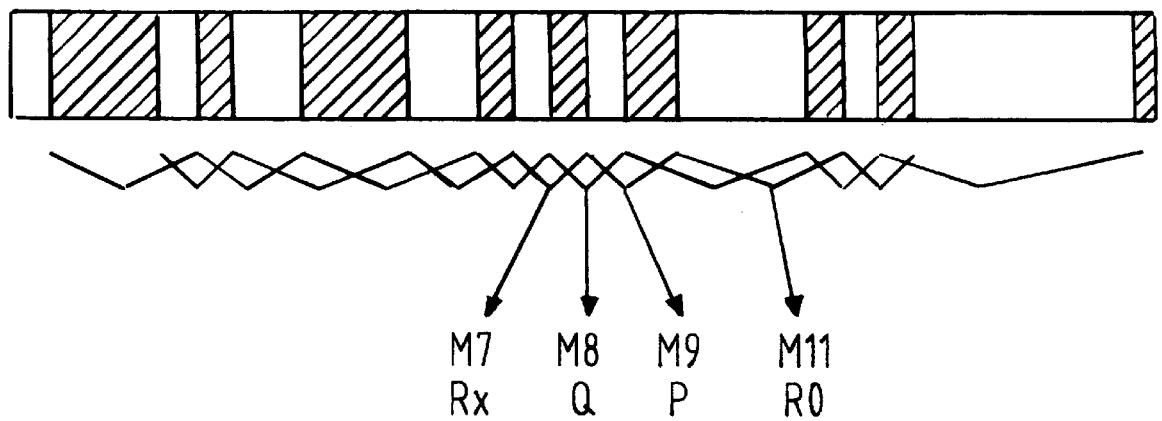
FIG. 13 shows a diagram in which the location of the regions P, Q, R0 and Rx is designated.
FIG. 14 shows a table for determining information marks on the basis of values of P and Q.

Shown in FIG. 14 is the value or values of the information mark for each combination of elements of P and Q and also to which series it belongs. From the table can be seen that for combinations with elements 3 and 4 of P and Q it is not possible to make an unambiguous statement about the value of the information mark. The choice is made at a later stage during constituting of the bar code halves. In order to provide the information required for this choice the set of values associated with the region designated R0 in FIG. 13 is also taken into consideration in the selection of the information mark. For this purpose the set of possible information marks is increased in the present decoding method from 20 {A0, A1, . . . ,A9, B0, B1, . . . ,B9} to 80 elements {1A0, 2A0, 3A0, 4A0, 1A1, . . . . , 4A9, 1B0, . . . . , 4B9}. The number to the left of the series indication denotes of how many modules the bar directly adjacent the information mark must consist. This number is 1, 2, 3 or 4 modules.

Figure 9:
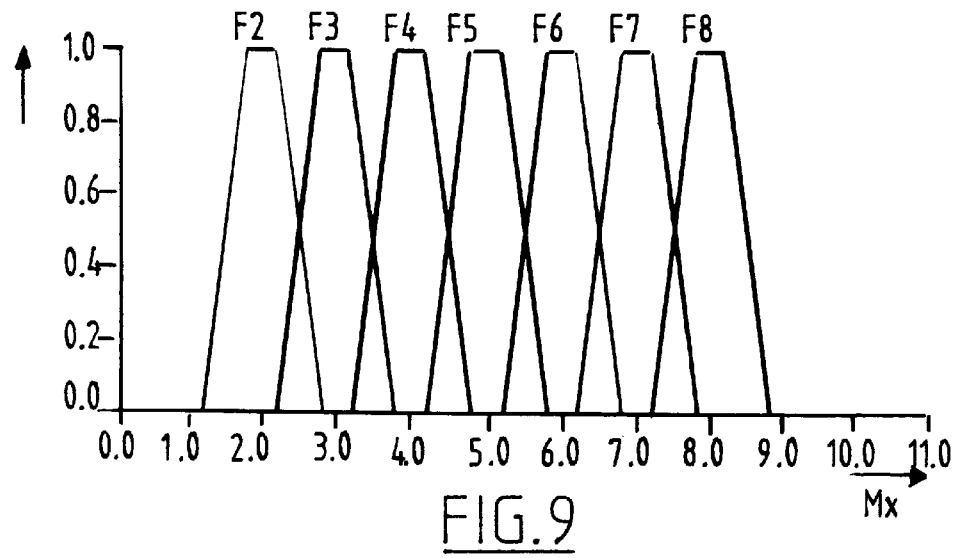

The set R0 is determined with membership functions of M11 such as for instance the functions F2 to F8 shown in FIG. 9. The set of possible information marks is a subset of the extended set of 80 information marks. The subset is found by combining elements of P, Q and R0 and looking up the combinations in the table in FIG. 15. To each information mark is assigned a degree which is calculated with a FUZZY-AND function or an algebraic product function of the degrees of the associated elements of P, Q and R0.

EXAMPLE: In FIG. 7, M11 has the value 4.62 in the case MARK is 0. With the membership functions of FIG. 9, R0 obtains the elements 4 (0.30) and 5 (0.70). Together with the elements of P and Q from the previous example, this gives the following possibilities for the information mark:

1B6 (0.46)

1A0 (0.11)

2A0 (0.25)

The degree placed in brackets is calculated with the algebraic product of the separate degrees.

Figure 10:
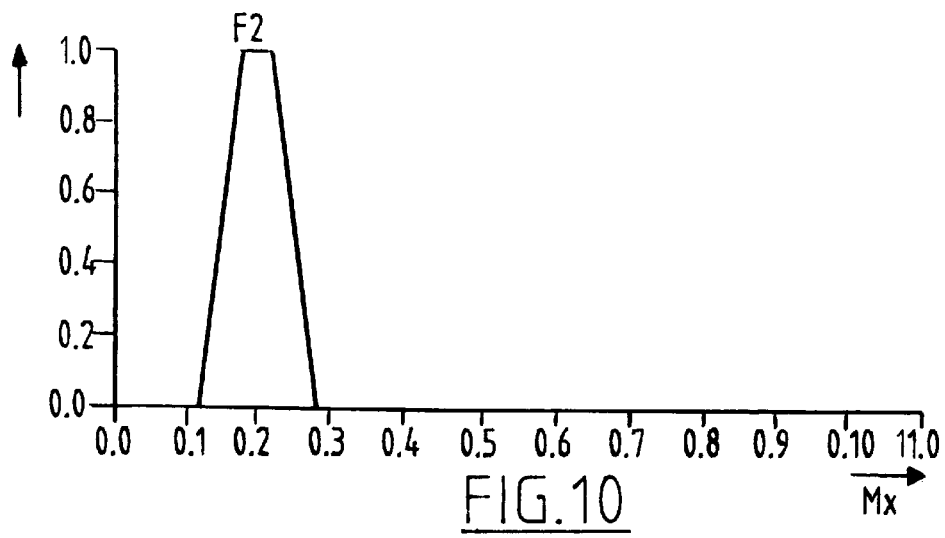

In the decoding of an information mark a check is always made for the presence of auxiliary marks. As shown in FIG. 3, the separation mark consists of 2 bars and 3 spaces, each comprising one module. The check takes place by fuzzification of M3, M4, M5 and M6 using a membership function F2, an example of which is given in FIG. 10. M7 is moreover also checked, which corresponds with the region designated with the symbol Rx in FIG. 13. As in the case of P and Q, this is a set which can contain the values 2, 3, 4 and 5. The membership functions of FIG. 8 are for instance suitable for determining the set Rx and the associated degrees. The region Rx lies partly in the information mark and partly in the separation mark. One module lies in the separation mark and the rest in the information mark. In a given information mark the number of modules of the outside bar is known, as shown in FIG. 2. This means that for every possible information mark a check is made as to whether it adjoins a separation mark. The degree of the auxiliary mark is calculated with a FUZZY-AND function of the degrees associated with M3 to M6 and the degree of the suitable element of Rx.

An edge mark consists of two bars and a space (see also FIG. 3). The check takes place as in the case of the separation mark by fuzzification using a membership function F2, in this case of M12 and M13. In contrast to the separation mark, no additional check need be performed for a region having an overlap with the information mark. The region R0 is in any case already involved in decoding that mark. This means that the presence of the edge mark does not depend on the content of the information mark. The degree of the edge mark is determined with a FUZZY-AND function of the degrees associated with M12 and M13.

Figure 11:
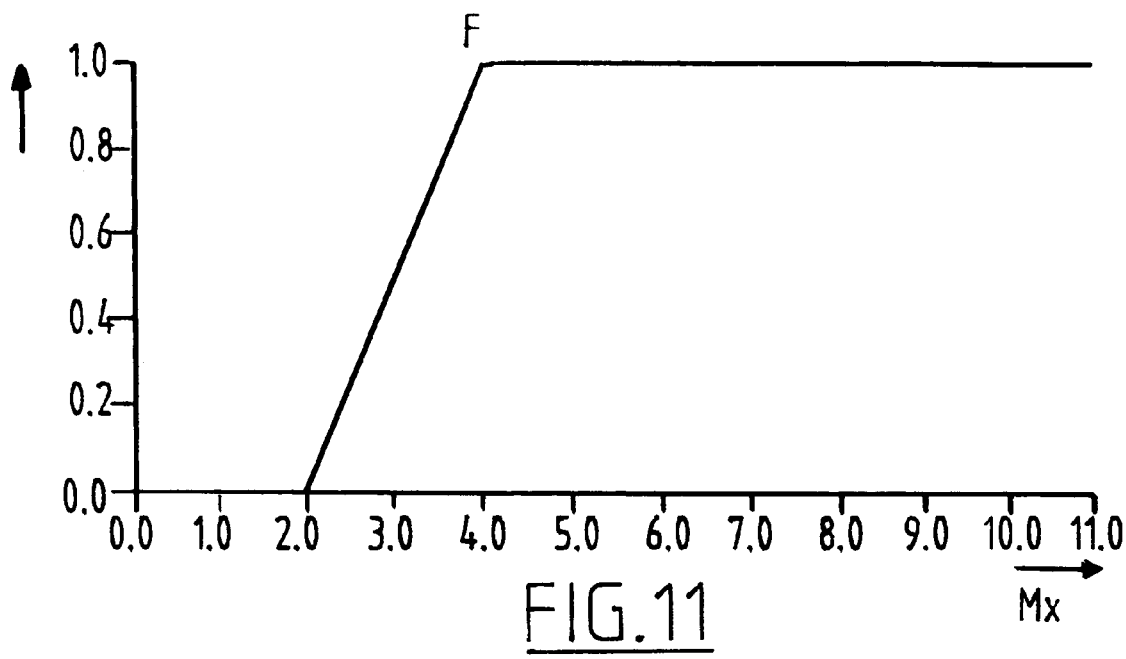

In an EAN-13 symbol different requirements are generally made of the left and right margin. Since it is not yet known at this stage of decoding whether an information mark forms part of a left or right half of the symbol, a check is made as to the presence of a left margin as well as a right margin. A membership function of M14 such as for instance Fmarg in FIG. 11 determines the presence and the associated degree. Different functions can therein be used for the left and right margin.

Figure 12:
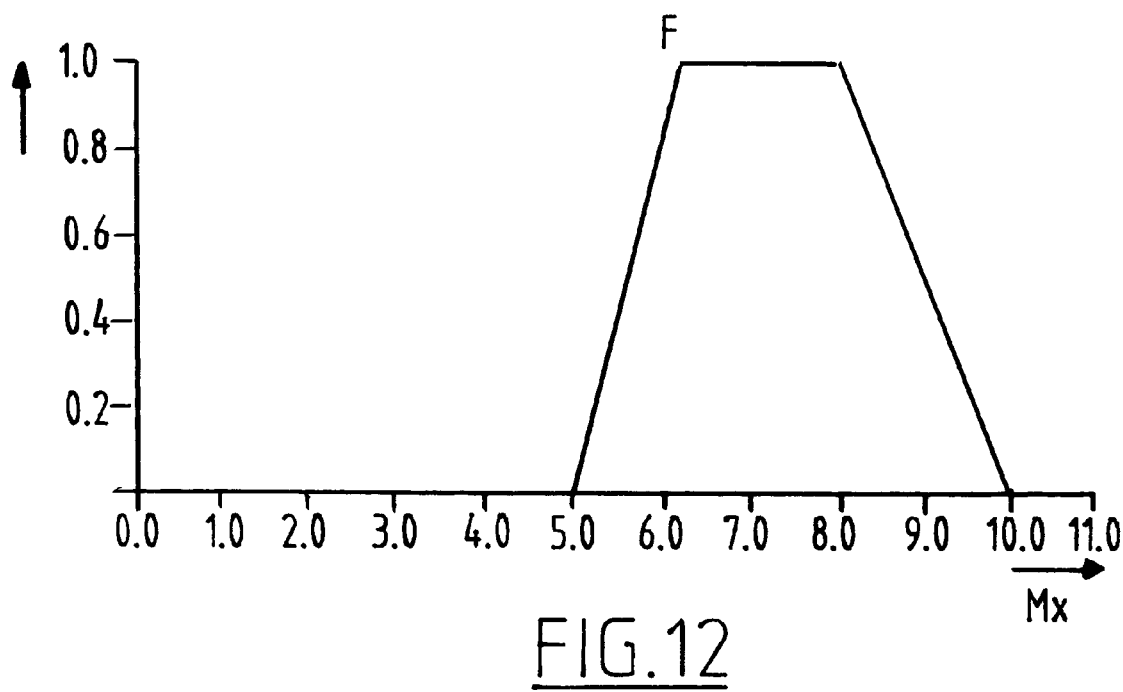

Finally, one further check is performed in the decoding of an information mark relating to the dimensions of mutually adjacent information marks. In the ideal case the marks within an EAN-13 symbol are equally wide, since they anyway each contain seven modules. In practice differences occur. The standardized width of a possibly adjacent information mark is found by adding M4 and M6. With a membership function such as for instance Finter in FIG. 12 is determined whether the mutual width ratio is correct and which degree is associated therewith.

In summary, it can be stated that at the level of decoding an information mark, at each fill of the data pipe the following information is determined and subsequently made available to the part of the decoding method in which halves are constituted:

A set of possible information marks from the extended set of 80 marks, each provided with a degree.

For each information mark the presence of a separation mark with associated degree.

The presence of an edge mark with degree.

The presence of a left margin with degree.

The presence of a right margin with degree.

The width ratio with an adjacent information mark with a degree.

Figure 4:
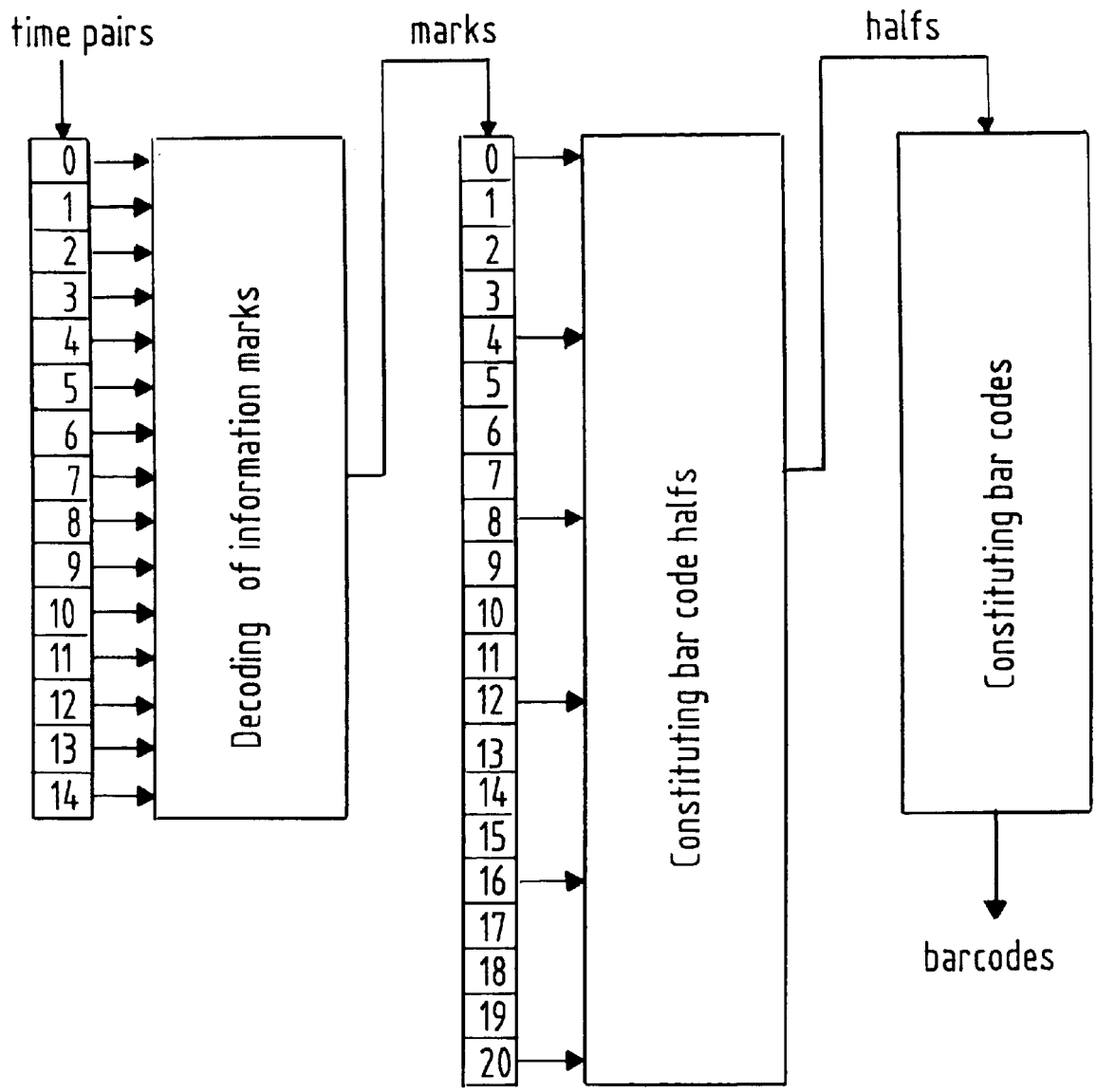
FIG. 4 shows a block diagram for decoding a bar pattern.

In order to constitute bar code halves the thus obtained data is again placed in a data pipe (see also FIG. 4). This data pipe consists of 21 registers. Each time new data is calculated the content of the data pipe shifts up one register to make room for the new data. The content of register 20 herein disappears while the new information is placed in register 0. The data pipe has branches at the registers 0, 4, 8, 12, 16 and 20, so that the data of six adjacent information marks becomes available. It is assumed herein that these six registers together comprise one or more bar code halves.

As in the decoding of information marks, the signal MARK here also indicates whether decoding must take place from inside to outside or in reverse direction. MARK indicates with the value 1 that register 0 and with the value 0 that register 20 contains the information mark which adjoins the separation mark. With this manner of operation not a single bar code half is skipped, and in any case with the correct polarity of MARK all halves end up at some point in the said positions of the data pipe.

Constituting of bar code halves commences from the separation mark. It is however equally possible to start from the edge mark. As already stated above, a start is made with register 0 if MARK has the value 1 and a start is made with register 20 if MARK has the value 0. This register contains a set of possible information marks. A start is only made with those marks which have a flag indicating the presence of a separation mark. As stated in the foregoing, each possible information mark comprises in addition to a numeric value and the series indication a value which designates of how many modules the adjoining bar in the adjacent mark must consist. All possibilities for the adjacent information mark meeting this requirement, while the mutual width ratio is moreover correct, are tried. This process, which is typically a form of so-called backtracking, is continued until the possibilities are also found for the information mark situated adjacently of the edge mark. For these latter information marks the limitation applies that the adjacent bar comprises only one module, since this is anyway a bar of the edge mark. In addition, the edge mark itself must be present.

Figure 17:
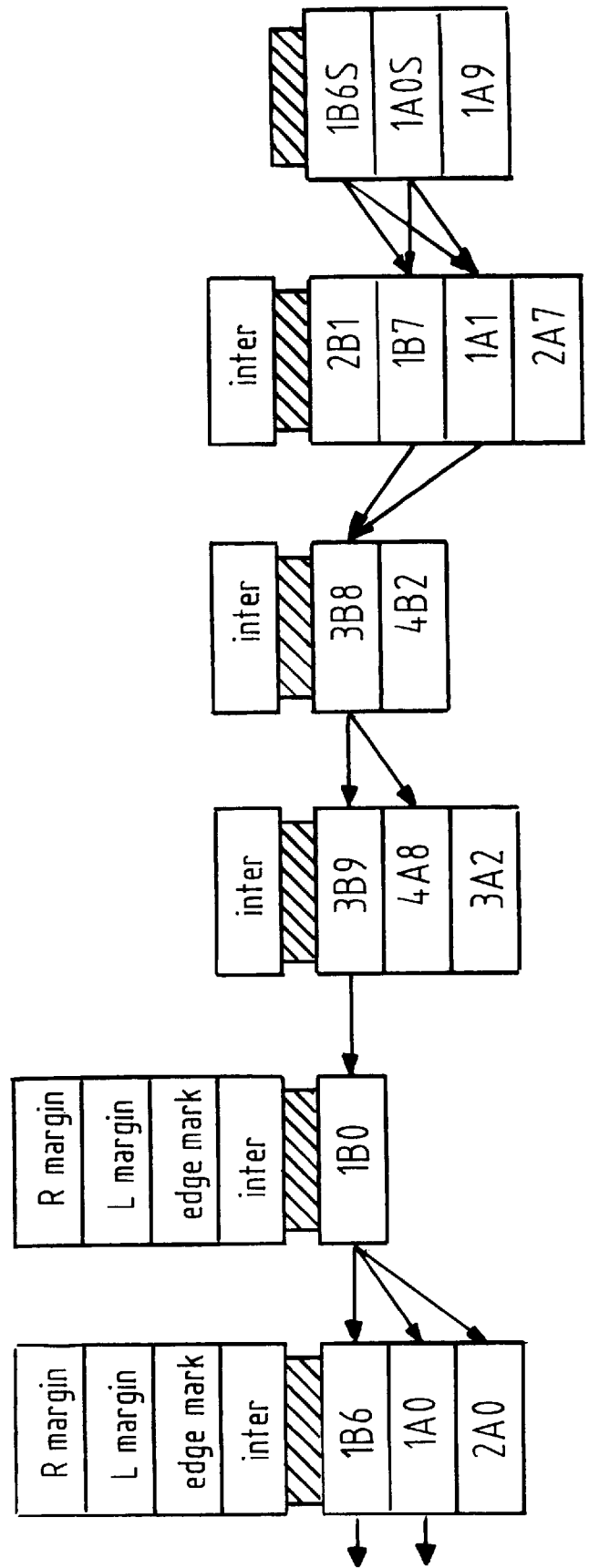
FIG. 17 shows an example of the content of the relevant registers of the second data pipe of FIG. 4.

EXAMPLE: In FIG. 17 the content of the data pipe is shown for the six branches. The paths found with the backtracking algorithm are designated with arrows. A path starts on the right of the figure with an information mark located adjacently of a separation mark (designated with S). A start is made with the marks 1B6 and 1A0. Adjacently of these marks must be an information mark having an outside bar consisting of one module. Both 1B7 and 1A1 meet this requirement. The width ratio of the adjacent information marks must moreover be correct. This is indicated with the flag ■inter■ which must have a degree greater than zero. The arrows indicate in each case which information marks meet these requirements and thus fit. The sixth information mark must fit next to an edge mark and in addition that edge mark must also be present with a margin. In this manner eight possible halves are generated:

B6-B0-B9-B8-B7-B6

A0-B0-B9-B8-B7-B6

B6-B0-B9-B8-A1-B6

A0-B0-B9-B8-A1-B6

B6-B0-B9-B8-B7-A0

A0-B0-B9-B8-B7-A0

B6-B0-B9-B8-A1-A0

A0-B0-B9-B8-A1-A0

Since at this stage six adjoining information marks have been found, the order permutation can also be checked. Only the permutations occurring in FIG. 16 are valid. The table shows whether it is a left or a right bar code half. Subject hereto, a check is also made as to the presence of a left or right margin. For a left half the table moreover gives the number which is printed in an EAN-13 symbol under the left margin and which is legible for people.

The backtrack method together with the additional checks gives a set of possible bar code halves. The set can be empty. Every possibility is provided with a degree which is calculated with a FUZZY-AND function of the degrees of the separate parts. The degrees of auxiliary marks are herein given a different weighting.

EXAMPLE: From the eight possible halves of the previous example, only two possibilities remain after checking the order permutation using FIG. 16:

B6-B0-B9-B8-B7-B6=right half 678906

A0-B0-B9-B8-A1-A0=left half $6_{13}009810$

All possible bar code halves are transmitted with associated degrees to the part of the decoding method in which the halves are constituted to complete bar codes.

When constituting bar codes, bar code halves are collected for a determined time. In order to reduce the amount of data, for identical halves the number of times this half occurs is recorded. The degree is herein enhanced with a FUZZY-OR function of the degree which applied to the halves collected up to that point and the degree of the new half. After collection the left halves are combined with the right halves. For a possible bar code the control number, the number in the right half next to the edge mark, must correspond to a modulo calculation of the other numbers. The degree of the bar code is calculated with a FUZZY-AND function of the degrees of the left and right halves, wherein the number of times the halves have occurred is taken into account.

If the set of possible bar codes comprises more than one element and there is clearly one bar code with a higher degree than the others, this bar code is generated as the most probable code. In other cases the number of times a half is found or the sequence in which the halves are found may determine the choice.

EXAMPLE: After a determined collection time the following bar codes are found:

right half 678906 with degree 0.80 and found 10 times left half $6_{13}009810$ with degree 0.15 and found twice left half $8_{13}712345$ with degree 0.95 and found 25 times right half 567815 with degree 0.05 and found once right half 876906 with degree 0.12 and found 3 times.

8 combinations are hereby possible. However, only two of the combinations have a correct control number:

$8_{13}712345_{13}678906$ with degree 0.76

$8_{13}712345$-876906 with degree 0.11

On the basis of the degree the first code is generated.

The membership functions form an essential part of the present invention. The functions can differ for information marks and auxiliary marks and can even differ per component of a mark. In the examples membership functions with a trapezoid form are used. A function with this form can be described with four vertices or a so-called trapezium quartet. Such a form can provide advantages in implementation. This does not however by any means exclude other forms for the membership functions in view of the great influence the choice has on the performance of the decoding method.

There are also various alternatives for the FUZZY-AND function, including the algebraic product and minimum functions. Similar functions are possible for the FUZZY-OR. Where necessary a square root or a root of a higher order may be taken of a degree with the purpose of giving the degree a smaller weighting in the evaluation of fuzzy logical expressions. There are however other possible methods of applying a weighting, such as for instance a weighted average.

The above described decoding method is also applicable to UPCA codes, as these codes correspond with EAN-13, wherein the left half contains only information marks from the A series (see FIG. 2). The method is applicable to UPCE codes. These codes correspond with a left half of an EAN-13 code. There is a difference in the use of order permutations, edge marks and margins. The method is further applicable to EAN-8 codes, which are in fact a shorter version of EAN-13 codes.

First results with the above described embodiment of the method according to the present invention have been obtained using a computer program and a printed circuit board developed for this purpose for a personal computer which is connected to a laser scanner. From a large number of measuring results the conclusion can be drawn that for representative situations for cash registers in supermarkets, the decoding method according to the present invention has a higher degree of first time correct reading. It has also been found that in some conditions the decoding method according to the present invention finds a correct solution while this was not possible at all with the existing decoding algorithm due to poor print quality.

Figure 18:
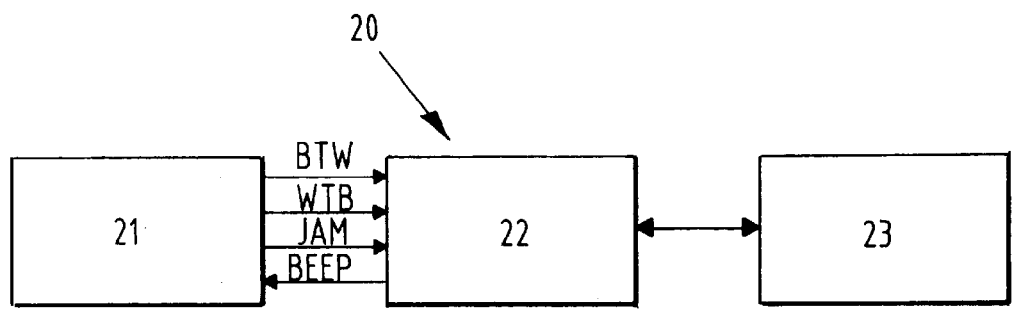
FIG. 18 shows a block diagram of a system incorporating a preferred embodiment of a decoding device according to the present invention.
Figure 19:
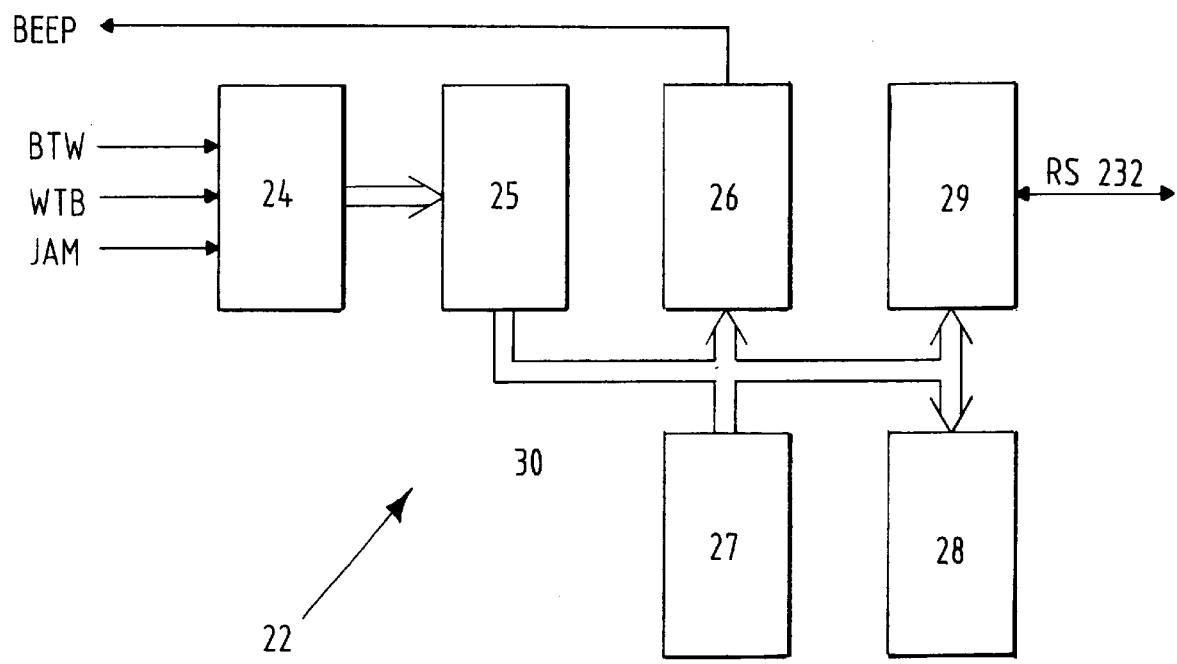
FIG. 19 shows a block diagram of the decoding device of FIG. 18.

A system 20 (FIG. 18) comprises a laser scanner 21, a decoding device 22 and a cash register 23. The decoding device 22 and the cash register 23 are connected via a serial line according to the RS232 protocol. The laser scanner 21 which was used in the present example gives three signals to the decoding device 22, i.e. BTW, WTB and JAM which respectively designate black to white transitions, white to black transitions and a strong increase in contrast in the bar codes scanned by the laser scanner 21. The decoding device 22 gives a signal BEEP to the scanner 21 with indicates that the bar code is detected. This signal is converted by the laser scanner 21 into a signal which is audible to the user and/or visible on for instance a LED. The decoding device 22 comprises an FPGA (Floating Point Gate Array) 24, a FIFO (First in First out) memory 25, a microprocessor 26, a memory of the ROM type 27, a memory of the RAM type 28 and a serial port 29 for the serial RS232 connection. The components 25, 26, 27, 28 and 29 are mutually connected using a bus structure 30.

By means of the FPGA, the operation of which will be explained further hereinbelow, the time pairs are determined as described above from the BTW, the WTB and JAM signals. The FIFO serves to absorb variations in the supply of time pairs by the FPGA, so that they can be processed by the microprocessor in the desired time frequency. Situated in the ROM 27 is the software for the microprocessor 26 such as described in the foregoing and in particular for the functions of decoding information marks, constituting bar code halves, constituting bar codes from bar code halves and selecting bar codes. Stored in the RAM 28 are interim results, such as the data pipe for time pairs, the data pipe for information marks and the decoded bar code halves. The microprocessor 26 must have a high processing speed and in the present embodiment a pentium processor of the Intel concern was used.

Figure 20:
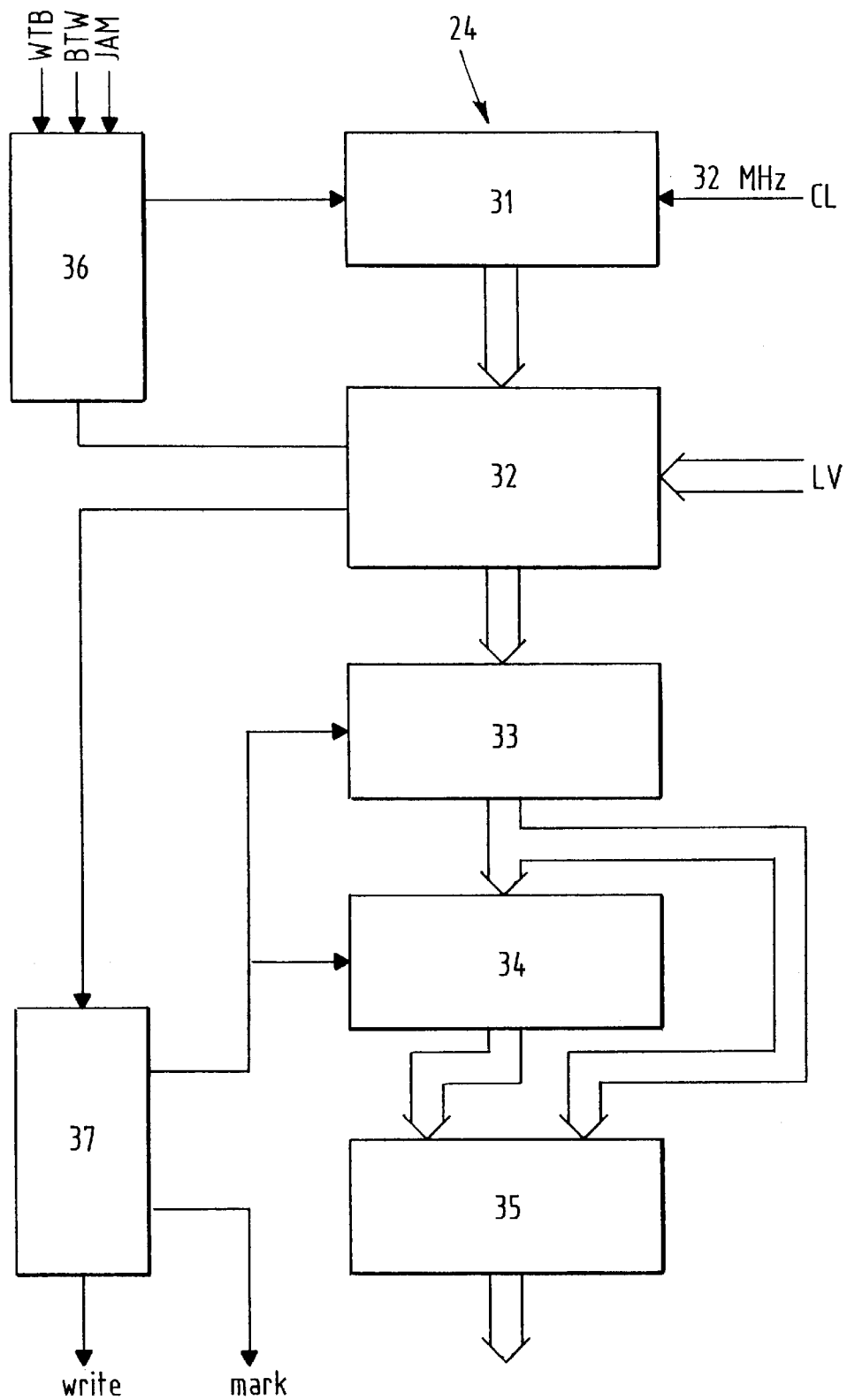
FIG. 20 shows a block diagram of the FPGA of FIG. 19.
Figure 21:
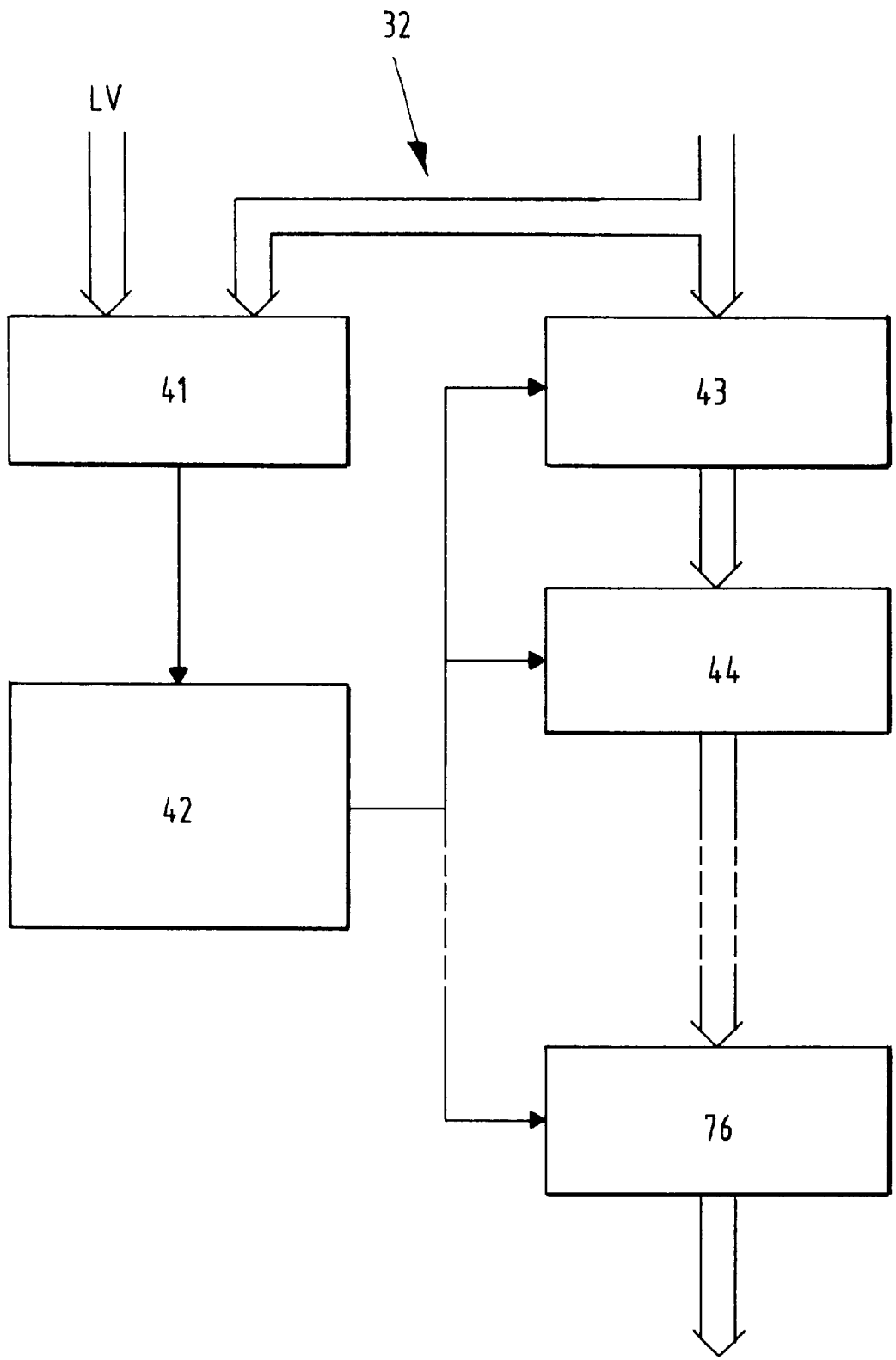
FIG. 21 shows a block diagram of the filter of FIG. 20.

The FPGA 24 (FIG. 20) comprises a counter 31 to which a clock signal CL with a frequency of 32 MHZ is connected, a filter 32, a first register 33, a second register 34, a full-adder 35, control logic 36 for the counter 31 and control logic 37 for the FIFO 25. The components are mutually connected in the manner outlined in FIG. 22. Using the counter 31 the number of periods is determined between transitions from white to black and vice versa. In this manner the width of all spaces and bars of the bar code are measured in time. At each transition the content of the counter is placed in the filter, while the counter is set to the value 1 by the control logic 36.

The filter, the operation of which will be further explained hereinbelow, serves to reduce the amount of data. Time values which cannot form part of a bar code are filtered out. The data which is not filtered out is placed in register 33, while the content of register 33 is shifted each time to register 34. Using the full-adder 35 the contents of registers 1 and 2 are added together, so that a width of a time pair is present at the output of the full-adder. This value is subsequently written into the FIFO by the control logic therefor and is accompanied by a bit MARK which designates whether the time pair is a space followed by a bar or, conversely, a bar followed by a space.

A strong increase in contrast indicated with the signal JAM usually means that the scan spot has come across a bar code after a light margin and that a space must be interpreted as a margin. The FPGA ensures that this space acquires the greatest possible width whereby it will meet the criterion for a margin during decoding.

The filter 32 comprises a comparator 41, control logic 42 for the filter, a register 43, 44 . . . 76, in accordance with the number of elements of a (half of a) bar code, in the present case 33 time values. A limit value LV is further supplied to the comparator 41 from the microprocessor 26, the value of which is adjustable or programmable. In the comparator 41 the input counter value is compared to the limit value LV. A bar or space within a bar code must be smaller in time than a determined limit value. The limit value is determined by the quotient of the maximum dimension of an element (space or bar) and the minimum speed of the spot of the laser scanner.

The registers 43–76 serve for temporary storage of the time value. The control 42 determines on the basis of the output of the comparator 41 whether the value must be written in the registers.

In the present embodiment the starting point is the decoding of EAN-13 halves. One half consists of three elements in the edge mark, twenty-four elements in the information marks and five elements in the separation mark, i.e. a total of 32 elements (see also FIGS. 1, 2 and 3). Only series of at least 32 time values which must rather be smaller than the limit values are therefore accepted as suitable for decoding. If the time value preceding the series comprises the width of a space this value must be passed on with the series. This is because a left or right margin could in fact be involved here. The same applies for the time value immediately following the series. The filter thus allows through series of adjacent time values with a length of at least 33 elements, for which purpose the filter comprises 33 registers.

It should be noted that it is of course possible to provide the filter with a smaller number of registers for filtering out short series, which simplifies the structure of the filter but on the other hand decreases the data reduction.

No limitations should be derived from the embodiments extensively described above. The requested rights are determined by the following claims, within the scope of which very many variations are possible, such as the method of fuzzification, the application of fuzzy logic and fuzzy sets, the defuzzification, in addition to decoding algorithms other than those described which make use of time pairs.

We claim:

1. Method for decoding one or more barcodes comprising a plurality of marks, wherein each of the marks comprises one or more spaces and one or more bars wherein each bar or space is formed by at least one module, and wherein the method comprises the steps of:

digitalizing electrical signals obtained from a pick-up for picking up reflected laser beams;

deriving from the obtained electrical signals for each barcode time pairs, each of which is formed by the combined width of a bar and an adjacent space;

deriving from said time pairs mark values indicating the number of modules covered by each time pair;

characterized by:

applying membership functions to said mark values to determine the membership degree with which each mark value has a length of an integer number of modules;

determining from the mark values and their membership degrees the possible information values represented by the barcode and their membership degrees, using a predetermined relationship between mark values and information values; and selecting the most probable information values for a bar code or part thereof using the determined information values and their membership degrees.

2. Method according to claim 1, wherein said predetermined relationship depends on the barcode type.

3. Method as claimed in claim 2, wherein bar code halves are combined to possible whole bar codes with a certain membership degrees.

4. Method as claimed in claim 1, wherein the information values are combined to form barcode halves with membership degrees.

5. Method as claimed in claim 4, wherein the recorded number of times an identical bar code half occurs is used to enhance the membership degree of the barcode half.

6. Method as claimed in claim 1, wherein the most probable bar code is determined by choosing information values with the highest membership degree.

7. Method according to claim 1, wherein additional checks on possible information values are performed to decrease the number of possible information values.

8. Method as claimed in claim 1, wherein the membership functions of a trapezoid form are used.

9. Apparatus for decoding one or more barcodes comprising a plurality of marks, wherein each of the marks comprises one or more spaces and one or more bars wherein each bar or space is formed by at least one module, and wherein the apparatus comprises:

means for digitalizing electrical signals obtained from a pick-up for picking up reflected laser beams;

means for deriving from the obtained electrical signals for each barcode time pairs, each of which is formed by the combined width of a bar and an adjacent space;

means for deriving from said time pairs mark values indicating the number of modules covered by each time pair;

characterized by:

means for applying membership functions to said mark values to determine the membership degree with which each mark value has a length of an integer number of modules;

means for determining from the mark values and their membership degrees the possible information values represented by the barcode and their membership degrees, using a predetermined relationship between mark values and information values; and means for selecting the most probable information values for a bar code or part thereof using the determined information values and their membership degrees.

10. Apparatus as claimed in claim 9, comprising filter means for reducing the amount of data to be processed.

* * * * *